(12) United States Patent
Ho

(10) Patent No.: US 7,644,961 B2
(45) Date of Patent: Jan. 12, 2010

(54) TUBE JOINT

(76) Inventor: Amber Ho, 235 Chung - Ho Box 8-24, Taipei (TW)

( * ) Notice: Subject to any disclaimer, the term of this patent is extended or adjusted under 35 U.S.C. 154(b) by 703 days.

(21) Appl. No.: 11/256,774

(22) Filed: Oct. 25, 2005

(65) Prior Publication Data

US 2007/0007768 A1    Jan. 11, 2007

(51) Int. Cl.
*F16L 23/00*    (2006.01)
(52) U.S. Cl. .................. 285/368; 285/412; 285/414
(58) Field of Classification Search .............. 285/363, 285/364, 368, 379, 412, 413, 414; 277/608, 277/614
See application file for complete search history.

(56) References Cited

U.S. PATENT DOCUMENTS

| | | | |
|---|---|---|---|
| 1,876,455 A * | 9/1932 | Inshaw | 285/109 |
| 2,070,291 A * | 2/1937 | McHugh | 285/55 |
| 2,211,983 A * | 8/1940 | Parris | 285/110 |
| 2,462,493 A * | 2/1949 | Hamer | 138/44 |
| 2,862,729 A * | 12/1958 | Bredtschneider | 285/114 |
| 2,919,936 A * | 1/1960 | Hurley | 285/55 |
| 3,507,506 A * | 4/1970 | Tillman | 277/614 |
| 4,133,557 A * | 1/1979 | Ahlstone | 285/39 |
| 5,120,086 A * | 6/1992 | Nock | 285/334.2 |
| 5,163,718 A * | 11/1992 | Cannon | 285/236 |
| 5,372,393 A * | 12/1994 | Austin | 285/354 |
| 6,790,526 B2 * | 9/2004 | Vargo et al. | 428/343 |

FOREIGN PATENT DOCUMENTS

| | | | |
|---|---|---|---|
| JP | 05272670 A | * | 10/1993 |
| JP | 06101787 A | * | 4/1994 |

OTHER PUBLICATIONS

Machine translation of JP 06101787 Document as obtained from http://www4.ipdl.inpit.go.jp/cgi-bin/tran_web_cgi_ejje?atw_u=http%3A%2F%2Fwww4.ipdl.inpit.go.jp%252 on May 17, 2009.*

* cited by examiner

*Primary Examiner*—James M Hewitt
*Assistant Examiner*—Jay R Ripley

(57) ABSTRACT

A tube joint for connecting two pipes comprises two enlarged openings formed at two pipes to be connected; a sealing pad between the two enlarged openings; each of two ends of the sealing pad are formed with a reduced stepped portion; a shape of the stepped portion being matched to the enlarged openings so as to be received in the enlarged opening; thereby the stepped portion can seal the enlarged opening; a middle section of the sealing pad being between the two reduced stepped portion and being protruded between the two enlarged openings; and two covering plates. Each covering plate encloses around a periphery of the enlarged opening and a periphery of the middle section of the sealing pad. Two first annular lips are installed around an outer periphery of the stepped portions of the sealing pad, and each sealing pad may be formed with a second annular lip.

1 Claim, 5 Drawing Sheets

TUBE JOINT

FIELD OF THE INVENTION

The present invention relates to pipe connections, and particularly to a tube joint for tightly sealing two pipes without draining of fluid within the pipes.

BACKGROUND OF THE INVENTION

In the transferring of fluid, it is often that no pollution is allowed so as to provide reliable fluid transformation. Thereby the connection of pipes in the transfer flow path is required to have preferred sealing effect.

For example, fluorine reins is preferred in temperature tolerance and anti-chemical corrosion, and has high purity. Thereby it is very suitable in the manufacturing process, storage, transformation, and operation of the chemical products. Thereby pipes or related parts made of fluorine resin are preferred in retaining the purity of the transferring chemical product in the pipes. However the fluorine pipes have defect of heat deformation, especially in high temperature. In the environment of temperature variation, the sizes of the pipes are easily changed. As a result, it induces the problem of fluid drainage from the pipes.

Moreover, referring to the FIG. 1, a prior art tube joint is illustrated. In the prior art, two pipes 10, 11 are machined with threads 101, 111 and then a tube joint 12 are used to screw the two pipes. The defect is that the pipes 10, 11 cannot be completely sealed by the joint 12. Especially when the pressure of the fluid in the pipes is too large, the connection will loose and then it is possible the fluid therein is released.

Therefore, it is necessary to design a novel design which has no the prior art defect. That is, no deformation occurs in the connection of the joints.

SUMMARY OF THE INVENTION

Accordingly, the primary object of the present invention is to provide a tube joint for connecting two pipes without drainage of fluid within the pipes.

To achieve above objects, the present invention provides a tube joint for connecting two pipes which comprises two enlarged openings formed at two pipes, respectively to be connected; a sealing pad between the two enlarged openings; each of two ends of the sealing pad being formed with a reduced stepped portion; a shape of the stepped portion being matched to the enlarged openings so as to be received in the enlarged opening; thereby the stepped portion can seal the enlarged opening; a middle section of the sealing pad being between the two reduced stepped portion and is protruded between the two enlarged openings; two covering plates. Each covering plate encloses around a periphery of the enlarged opening and a periphery of the middle section of the sealing pad. Two first annular lips are installed around an outer periphery of the stepped portions of the sealing pad, and each sealing pad may be formed with a second annular lip.

The various objects and advantages of the present invention will be more readily understood from the following detailed description when read in conjunction with the appended drawing.

DETAILED DESCRIPTION OF THE INVENTION

In order that those skilled in the art can further understand the present invention, a description will be described in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
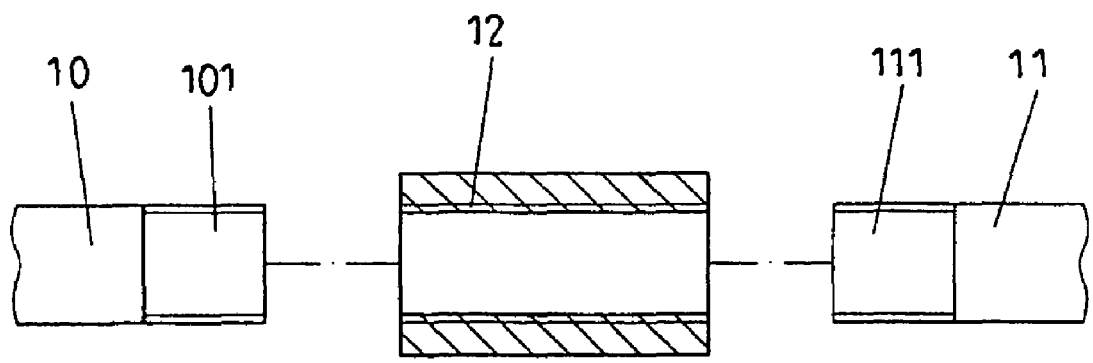
FIG. 1 shows a prior art tube joint.
Figure 2:
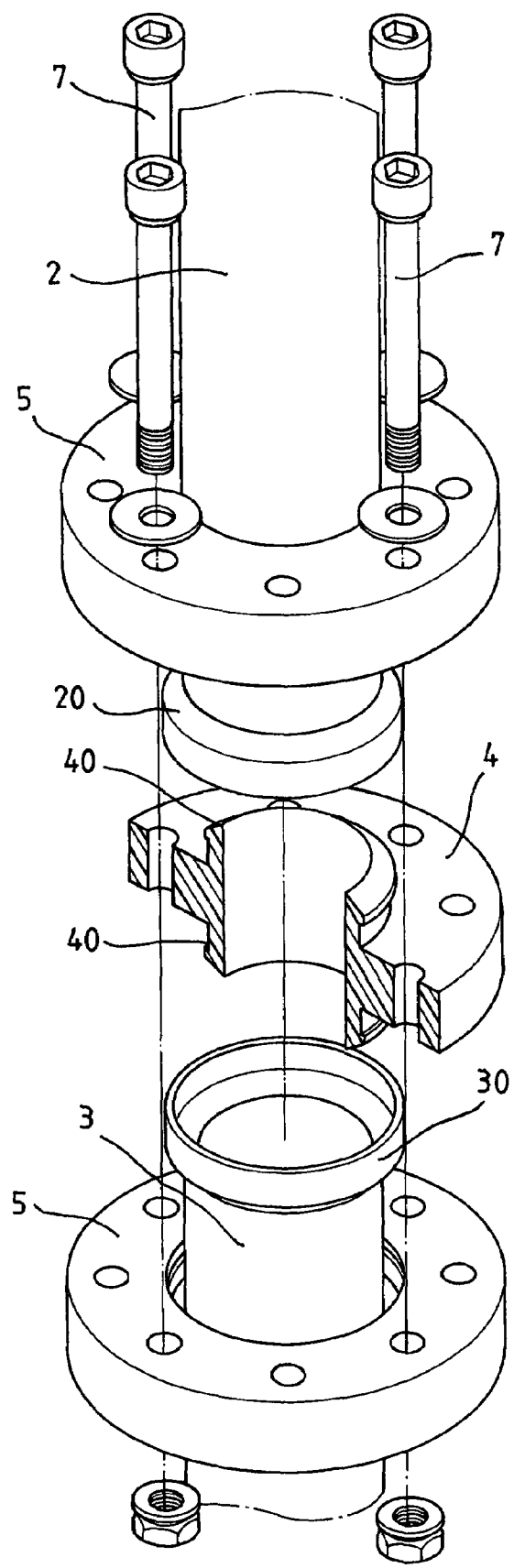
FIG. 2 is an exploded perspective view of the present invention.
Figure 3:
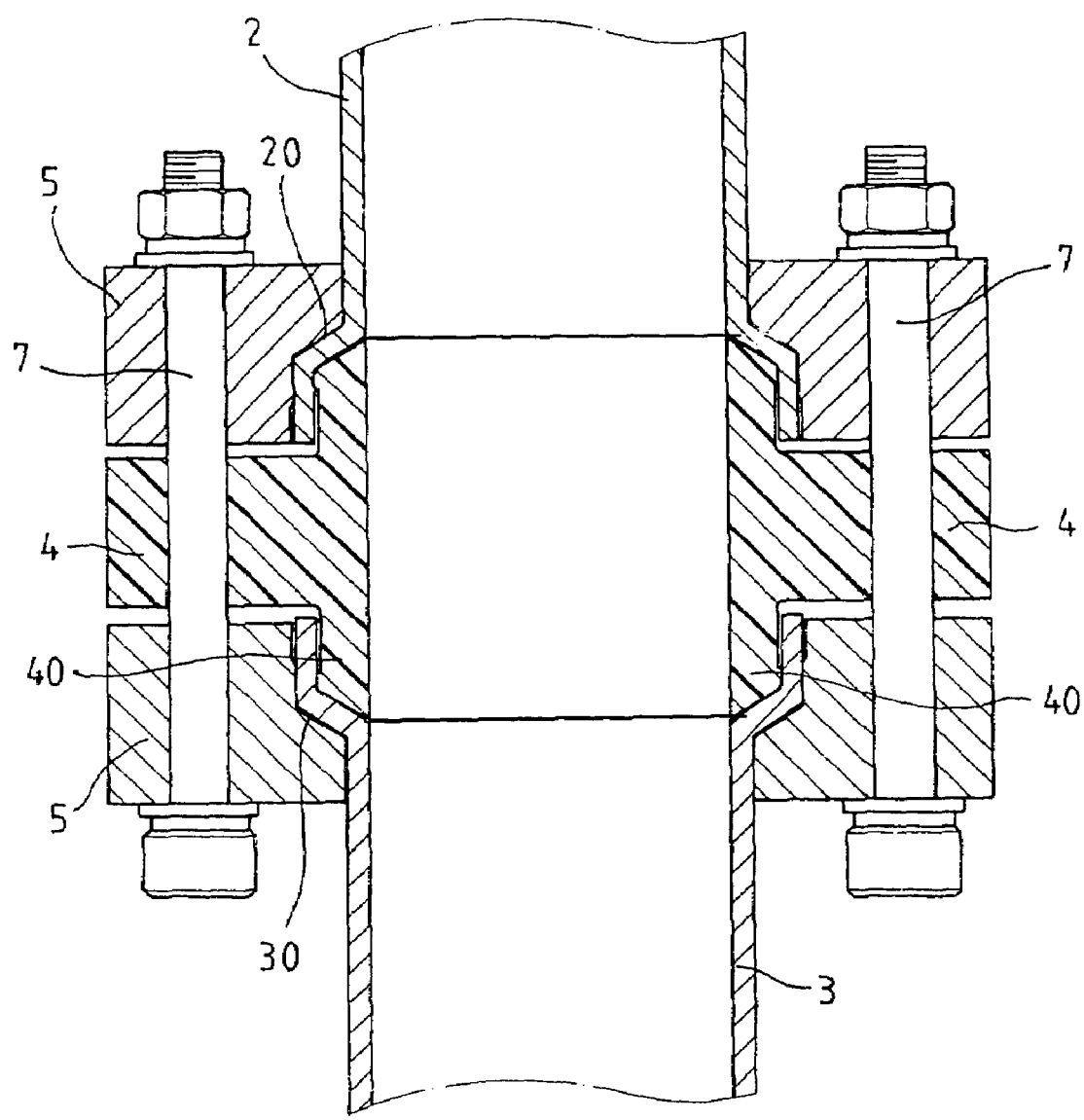
FIG. 3 shows the first embodiment of the present invention.

Referring to FIG. 2, the tube joint of the present invention is illustrated. The tube joint serves to connect two pipes, such as the pipe 2 and pipe 3 in the drawing. The present invention has the following elements.

Two enlarged openings 20, 30 are formed at two pipes 2, 3, respectively to be connected.

A sealing pad 4 between the two enlarged openings 20, 30. Each of two ends of the sealing pad 4 is formed with a reduced stepped portion 40. A shape of the stepped portion 40 is matched to the enlarged openings 20, 30 so as to be received in the enlarged opening 20, 30. Thereby the stepped portion 40 can seal the enlarged opening 20, 30. A middle section of the sealing pad 4 is between the two reduced stepped portions 40 and is protruded between the two enlarged openings 20, 30.

Two covering plates 5 are included. Each covering plate 5 encloses a periphery of the enlarged opening and a periphery of the middle section of the sealing pad 4.

In assembly, at least one lock element, for example, a stud 7, serves to pass through the covering plates 5 and the sealing pad 4 so as to tightly seal the sealing pad 4 to achieve the effect of sealing the pipes 2, 3.

Figure 4:
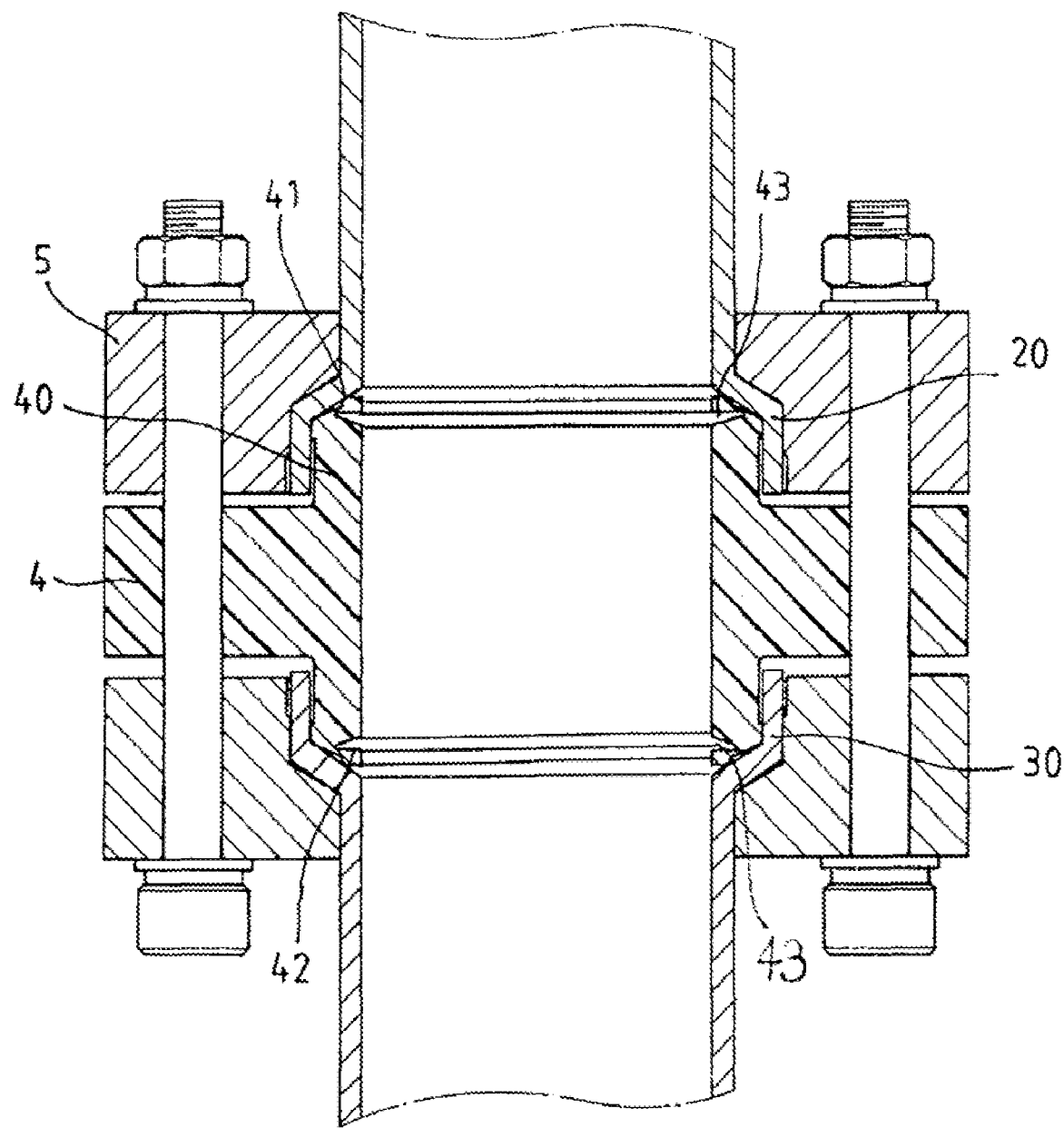
FIG. 4 shows the second embodiment of the present invention.

Referring to FIG. 4, the second embodiment of the present invention is illustrated. Two annular lips 41, 42 are installed around an outer periphery of the stepped portions 40 of the sealing pad 4. Each stepped portion 40 is formed with a notch 43. The annular lip 41, 42 is installed in the notch 43 so as to provide a space for the deformation of the annular lip. When water flow through the enlarged openings, the annular lip will deform to give a pressure to the stepped portion 40 to tightly seal the enlarged openings 20, 30.

Figure 5:
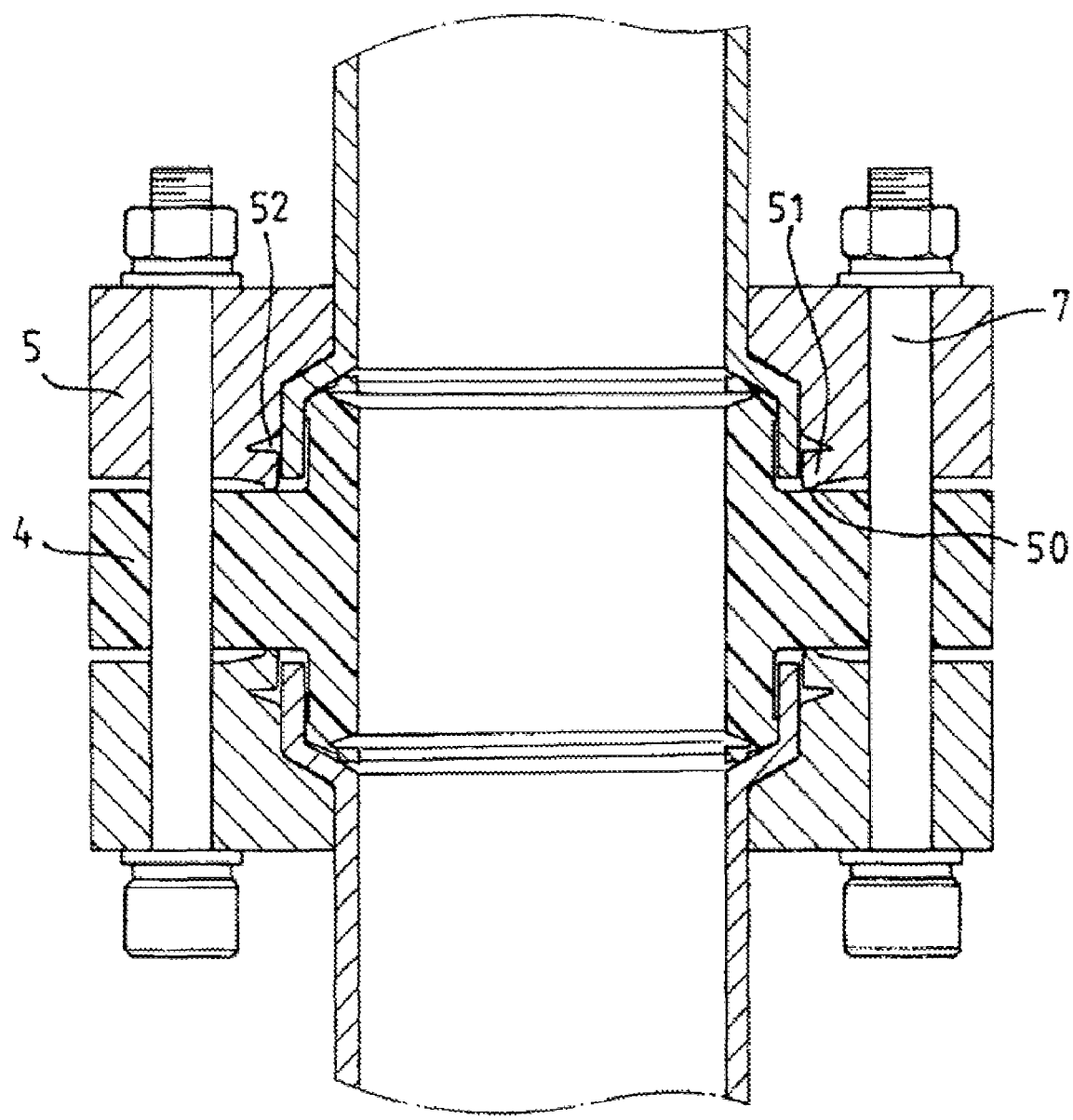
FIG. 5 shows the third embodiment of the present invention.

Referring to FIG. 5, the third embodiment of the present invention is illustrated. Each covering plate 5 is formed with an annular lip 50. One side of the annular lip 50 near the middle section of the covering plate 5 is formed with a deformation portion 51. When the covering plate 5 is locked, the deformation portion 51 will deform so that the material of the annular lip 50 deforms. By the stress from the deformation of the annular, a pressure is provided to the covering plate 5 so as to seal the pipes 20, 30. An inner lower edge of each covering plate 5 is formed with a notch 52 to define the annular lip at a lower end of the covering plate 5 so as to provide a space for the deformation of the annular lip 50 so that when a force is applied to the covering plate 5, the annular lip 51 will deform so as to tightly seal the covering plate 5 and the sealing pad 4.

Generally, the covering plates 5 are made of plates. Furthermore, the annular lips 50 are elastic. A periphery of the covering plate 5 is enclosed by non-metal material so that the covering plate 5, the annular lip and the deformation portion 51 have the effect of elasticity.

Thereby the tube joint of the present invention is multiple effects to the tightness of two connecting pipes. Thereby the sealing effect can be achieved by the pressure of the fluid within the pipes.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A tube joint for connecting two pipes comprising:

two pipes; each pipe being formed with a respective enlarged opening;

a sealing pad arranged between the two enlarged openings of the two pipes;

two reduced stepped portions; each of two ends of the sealing pad being formed with a respective one of the two reduced stepped portions; a shape of each stepped portion being matched to the enlarged openings so as to be received in the enlarged opening; whereby each stepped portion can seal the enlarged opening; a middle section of the sealing pad being between the two reduced stepped portions and being protruded between the two enlarged openings; and two covering plates; each covering plate enclosing a periphery of the enlarged opening and a periphery of the middle section of the sealing pad; and wherein each outer end of the stepped portion is an inclined surface and a corresponding surface of each enlarged opening is also an inclined surface; and wherein two first annular lips are formed around an end periphery of the stepped portions of the sealing pad, wherein when water flows through the enlarged openings, each first annular lip will deform to give a pressure to the respective stepped portion to tightly seal the enlarged openings; and wherein each stepped portion is formed with a first notch in the inner radial periphery, and each first notch provides a space for deformation of a respective first annular lip; and wherein an inner radial surface of each covering plate is formed with a second notch to define a respective second annular lip of the covering plate; each second notch provides a space for the deformation of the respective second annular lip; wherein when a force is applied to the covering plates, the second annular lips will deform to tightly seal the covering plates with the sealing pad.

* * * * *